United States Patent [19]

Davis et al.

[11] Patent Number: 4,844,333

[45] Date of Patent: Jul. 4, 1989

[54] SPA SIDE CONTROL UNIT

[75] Inventors: Matthew A. Davis, Mentor; James R. Mismas, Concord, both of Ohio

[73] Assignee: Tridelta Industries, Inc., Mentor, Ohio

[21] Appl. No.: 179,495

[22] Filed: Apr. 8, 1988

[51] Int. Cl.⁴ .......................................... G05D 23/00
[52] U.S. Cl. ...................................... 236/51; 165/24; 4/524; 128/367; 236/94
[58] Field of Search ....................... 236/51, 94; 165/24; 4/524; 219/328; 362/32; 128/367

[56]  References Cited

U.S. PATENT DOCUMENTS

| Re. 23,894 | 11/1954 | Burkhard, Jr. et al. | 200/168 |
|---|---|---|---|
| 2,831,084 | 4/1958 | Swinarski | 200/82 |
| 2,933,570 | 4/1960 | Tutthill | 200/83 |
| 3,080,720 | 3/1963 | Downs et al. | |
| 3,441,957 | 4/1969 | Friedman | |
| 3,781,623 | 12/1973 | Neumann | 200/81.4 |
| 3,821,684 | 6/1974 | Keating | 236/51·X |
| 4,233,694 | 11/1980 | Janosko et al. | 4/542 |
| 4,243,857 | 1/1981 | Reis | 200/83 C |
| 4,340,981 | 7/1982 | Vanaga | 4/536 |
| 4,384,190 | 5/1983 | Janson | 236/51 X |
| 4,480,533 | 11/1984 | Bolton et al. | 165/24 |
| 4,681,255 | 7/1987 | Drost | 236/51 |

Primary Examiner—William E. Wayner
Attorney, Agent, or Firm—D. Peter Hochberg; Mark M. Kusner; Louis J. Weisz

[57] ABSTRACT

A control unit for a spa or hot tub system is disclosed. The control unit is safe and protects the user from electric shock when operating the various spa equipment. Also, the unit allows the control and operation of all the spa equipment from a single location. In one embodiment of the invention, a specific air pressure transmitter has been designed to actuate remote air switches of different spa or hot tub equipment.

11 Claims, 4 Drawing Sheets

SPA SIDE CONTROL UNIT

BACKGROUND OF THE INVENTION

1. Field of the Invention

This invention relates to a unit for controlling spa equipment and the like from a remote location. Specifically, an easily installed, self-contained unit that comprises various actuating means and controlling means on the face plate of the unit for operating all the equipment of the spa from a single location or unit has been developed. This unit is a highly safe unit in that the electrical components for the unit are sealed in a water tight housing separated and insulated from the face plate of the control unit.

2. State of the Art

Spa, hot tub, jacuzzi and whirlpool type devices are becoming increasingly popular in their use and installation in the home, as well as at community and private recreation facilities. There is a wide variety of such devices available on the market. Most of these devices include a heating apparatus, and various electric motors to drive the pumps and blowers needed to circulate the water, spa lights and other associated equipment. In many cases, the various devices do not come with a single unit to remotely operate all the spa equipment while the spa is in use. Additionally, concerns have arisen with water leakage and moisture that could affect the operation and performance of the spa equipment and controls.

Examples of spa control units include U.S. Pat. No. 4,681,255 which discloses a cable driven spa thermostat controller. While this patent is directed primarily to a unit that contains a temperature control device, it is disclosed that the unit may optionally comprise pneumatic control units. These units are referred to as switches and there is no further disclosure or teaching regarding such units or switches. The patent does not disclose a single unit from which all of the spa equipment may be controlled or operated.

U.S. Pat. No. 4,233,694 discloses an entire spa construction which includes a single control panel. This panel comprises magnetic reed switches, as opposed to pneumatic type actuation means for operating the various spa equipment. This patent does not disclose a control unit that may be used for a variety of different spa, hot tub and the like devices nor one that contains a light display to indicate the operation of the various spa equipment utilizing light bars.

Sealed housings for various control units, remote pneumatic switching devices and the like have been known for use with a variety of different devices. For example, U.S. Pat. No. 4,243,857 discloses a switching device where the internal components are contained within a hermetically sealed receptacle.

U.S. Pat. No. 3,441,957 discloses a lighting system for a swimming pool where the switches for the lighting system are remotely located, for example, in a house or other structure.

U.S. Pat. No. 3,781,623 discloses an electro-mechanical lifting device which is controlled and operated by pneumatic switching and control means.

U.S. Pat. No. 3,821,684 discloses a remote setting thermoswitch which contains a temperature sensing element to control the switch and the switch is housed in a sealed hydraulic system.

U.S. Pat. No. 3,080,720 discloses a remote control switch which is of the electro-mechanical variety.

U.S. Pat. No. 2,831,084 discloses a hydraulic electric switch that may be operated from a remote location. The operation of the switch is effected through a sealed, self-contained hydraulic system.

U.S. Pat. No. Re 23,894 discloses a sealed electro-mechanical switch assembly.

U.S. Pat. No. 2,933,570 discloses a remote pneumatic switching device for a pump.

U.S. Pat. No. 4,340,981 discloses a self-contained bathing unit that contains a control panel sealed from moisture and the like.

None of the foregoing disclosures teach or suggest a single unit for controlling spa equipment from a remote location. Furthermore, none of the above disclosures teach, for example, a unit that has the flexibility of the interchangeability of different actuation and/or control means, or a light display constructed from clear plastic light bars and the like.

SUMMARY OF THE INVENTION

A highly safe, easily installed and assembled control unit, for indoor or outdoor spa/hot tub systems and the like has been developed. This unit contains all the necessary controls and actuation means for controlling and operating all spa equipment from a single location.

An important feature of this invention is its safety. The electrical components for the unit are separated by distance and insulating materials from the face plate of the unit which contains the various control and actuation means. The unit contains a light display to indicate which of the spa equipment is in operation, e.g., the jets, blower and the like. The light bulbs and circuitry for the light bulbs and thermostat are separated from the face plate or control panel by clear plastic bars that transmit light.

The unit is designed such that the actuation means for the spa equipment may be exchanged for another equivalent actuation means.

As opposed to the great majority of the spa or hot tub systems available in the market which have the thermostat mounted adjacent to the heating apparatus, the thermostat is mounted in the control unit of the present invention and the water temperature is controlled from this unit.

A specially designed air transmitter actuation means for actuating various spa equipment which has several advantages from the standpoint of reliability, wide application and relative ease of manufacture and assembly, has also been discovered and is employed in the unit of the present invention.

These and other aspects of the present invention will become clear to those skilled in the art upon the reading and understanding of the specification.

BRIEF DESCRIPTION OF THE DRAWINGS

The invention will be further described in connection with the attached drawing figures showing preferred embodiments of the invention including specific parts and arrangements of parts. It is intended that the drawings included as a part of this specification be illustrative of the preferred embodiments of the invention and should in no way be considered as a limitation on the scope of the invention.

DETAILED DESCRIPTION OF THE PREFERRED EMBODIMENTS

Figure 1:
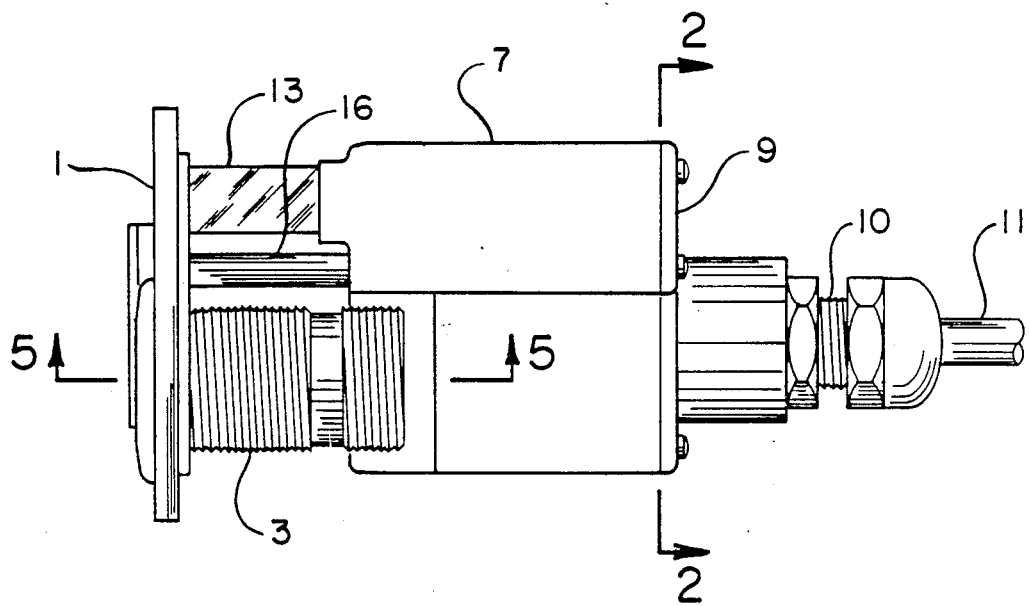
FIG. 1 is a side elevational view of the control unit according to one embodiment of the present invention.

The control unit of a preferred embodiment of the present invention comprises:

a housing 7 for containing the electrical components of the unit in a water tight compartment;

a thermostat 8 connected to a temperature selector control knob 2;

a face plate 1;

clear plastic light bars 13 capable of transmitting visible light and disposed between the housing and face plate;

circuit board 14 holding the electrical circuitry for controlling the indicator lights and heater circuit;

actuator means comprising an air transmitter 3; and a power cord set 11 for connecting the unit to a power source and load switching components, e.g., pumps.

The control unit controls the operation, and in particular, the temperature selection of the water, as well as other spa and/or hot tub equipment from a single location. A control unit of the present invention may be used with indoor or outdoor spa/hot tub systems. The unit provides remote temperature adjustment through thermostat 8, which is operated by manually adjustable knob 2. An indicator light display 42 on the face plate 1 signals the operation of the various spa equipment with legends indicating "heater ready", "heater on", "jets on", and "blower on". Interchangeable remote actuator means and preferably air pressure transmitters 3 are installed in the face plate of the control unit according to the present invention, and are connected to remote air switches to operate the various spa equipment, i.e., blowers, pumps, heaters, spa lights and other associated equipment. While one, two or three pressure air transmitters are preferred for the unit of the present invention, this may be varied according to the particular system for which the control unit of the present invention is to be used.

The housing, rear plate, face plate, air transmitters and clear plastic bars may be molded from the appropriate UL approved plastics. Such plastics should be heat resistant, dimensionally stable, have high impact strength and resistant to degradation by oxygen, ozone, halogens and the like. For the housing, face plate and the like, preferred moldable plastics include Prevex VKA or VGA manufactured by Borg Warner Chemicals. The air transmitters and temperature selector button are preferably molded from Cycolac T, manufactured by Borg Warner Chemicals. The clear plastic light bars 13 are preferably molded from plexiglas V 920-100 manufactured by Rohm & Haas Company, i.e., polymethylmethacrylate and copolymers thereof. These light bars may range in a variety of different dimensions depending on the particular size of the control unit. For the purpose of the present embodiment, these dimensions may range from $\frac{1}{2}$ inch to $1\frac{1}{2}$ inches in length, $\frac{1}{4}$ of an inch to $\frac{3}{4}$ of an inch in thickness and $\frac{1}{2}$ inch to 1 inch in width. It is emphasized that these dimensions are controlled primarily by the size of the unit.

In general, the construction of the unit involves integrally wiring the cord set and thermoset to a circuit board containing neon lights. The circuit board and thermostat unit with the exception of the temperature sensing element are sealed in the unit housing. The neon lights for the light indicator display are seated in grooves in the clear plastic bars. Thus, all the electrical components of the unit are sealed in a single compartment of the unit and are spaced a distance from the face plate, as well as insulated from the face plate by UL approved plastic material. The plastic light bars are adhesively fastened to the face plate and the housing, as well as the posts of the housing are adhesively adhered to the nibs on the underside of the face plate.

As an example of the operation of the indicator light display indicating the operation of various spa equipment for typical spa/hot tub systems, the jet pump and air blower lights may be triggered by the jet pump and air blowers circuit through a sequencing switch external to the unit of the present invention. The heater READY and heater ON lights may be controlled through the thermostat. In the normally closed position (heater OFF), the heater READY light will be on. While in the normally open position, the heater is operating and the heater ON light will be on.

Referring to the drawings, FIG. 1 shows a side view of the unit according to one embodiment of the present invention fully assembled with the exception of the cord set. The face plate 1 is adhered to the housing 7. In this view, it is shown that post 16 and clear plastic light bar 13 are adhesively fastened to housing 7 and face plate 1. The adhesive may be any curable high strength adhesive. The air pressure transmitter 3 has been installed in face plate 1 by threading the air transmitter through a threaded opening in the face plate. The gap between the face plate 1 and housing 7 should be noted in particular that the only contact shown in this figure is with post 16 and clear plastic light bar 13. Therefore, the electrical components of this control unit are located at a distance from the face plate 1, and are also insulated through plastic post 16 and light bar 13. This provides an important safety feature to protect users of the apparatus from electrical shock.

Figure 2:
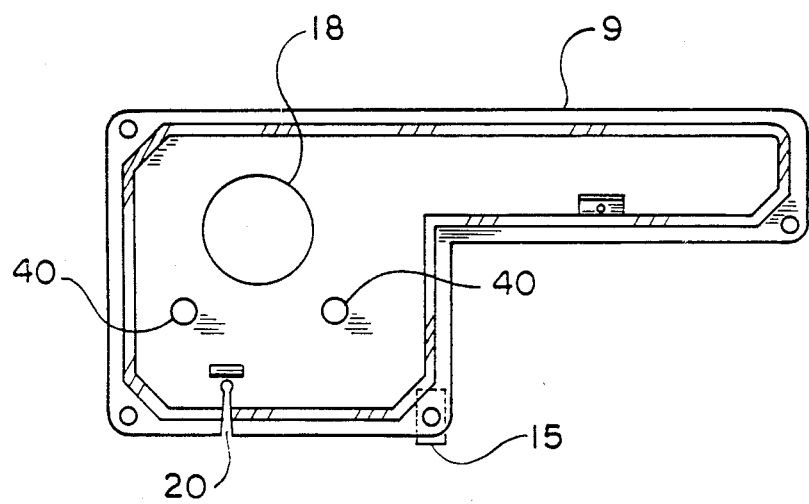
FIG. 2 is a view taken along line 2—2 in FIG. 1, showing the rear panel of the compartment for the electrical components according to one embodiment of the present invention.

FIG. 2 illustrates the back plate 9 of housing 7. An opening 18 is provided for the insertion of the power cord. A slot 20 is provided to receive the connecting lead to a temperature sensing element, and a bracket 15 is provided to hold or orient this connecting lead away from the housing, as well as for strain relief.

Figure 3:
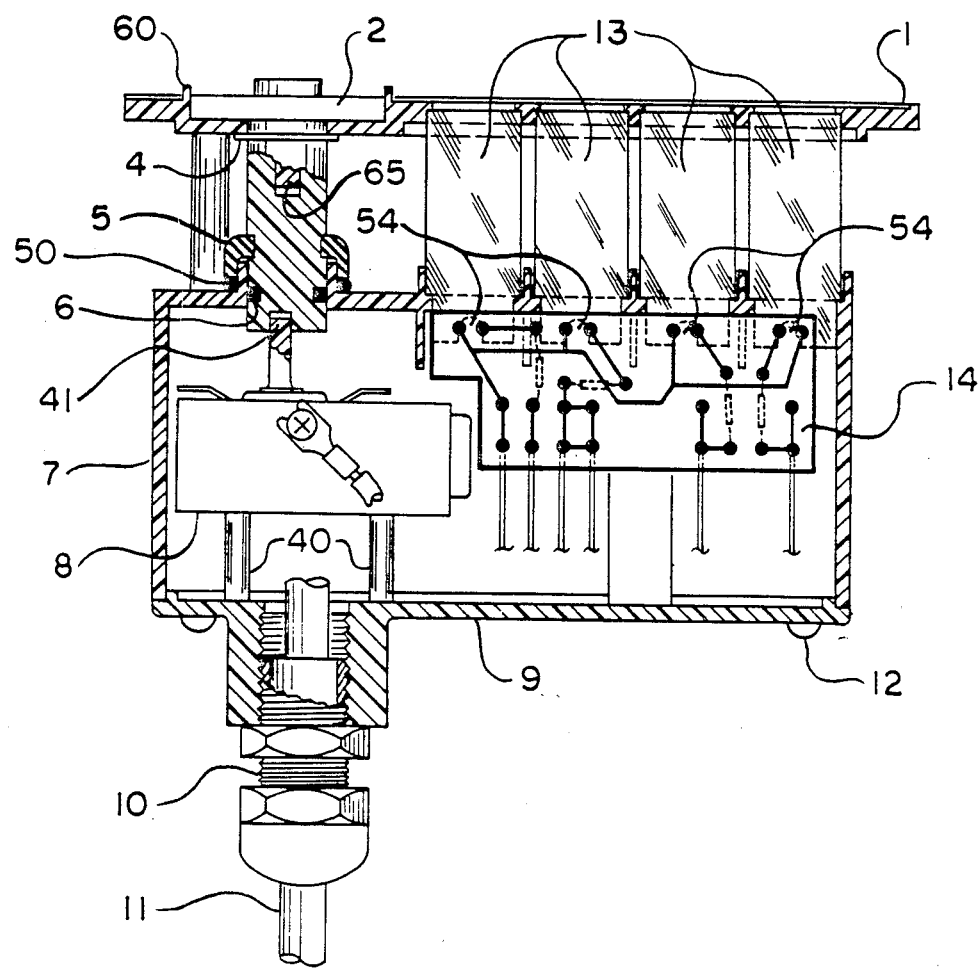
FIG. 3 is a sectional view taken along line 3—3 of FIG. 4 showing a control unit in accordance with one embodiment of the present invention.

Turning to FIG. 3, a sectional top view of a control unit in accordance with the present invention is illustrated. This figure shows the arrangement of the electrical components in housing 7. The temperature selection knob 2 is connected to thermostat 8 through a slotted post inserted into the molded plastic knob mechanism. It is also noted that the knob 2 may be removed since the knob contains a slotted post (not shown) for insertion on the face plate turning mechanism. This may be a desirable safety feature, particularly if small children have access to the spa or hot tub device. A wall 60 is included on the surface of the face plate 1 around the temperature selection knob 2 to prevent water leakage into the knob mechanism. A pair of posts 40 hold the thermostat in place relative to back plate 9. Four clear plastic light bars 13 are mounted between face plate 1 and housing 7. Circuit board 14 controls the heater and indicator lights (not shown) which illuminate bars 13, to in turn illuminate indicators 42. The temperature selector knob 2 arrangement is secured to the face plate by snap in retaining ring 4. A boot 5 is adhesively secured to the housing 7 to prevent water seepage into housing 7. An O-ring 50 seals the juncture between boot 5 and housing 7. Another O-ring 6 seals the temperature selection mechanism from housing 7. Power cord 11 is installed through strain relief 10. Screws 12 secure rear plate 9 to housing 7. A silicone based sealant is used to further seal the rear plate 9 to the housing 7.

Figure 4:
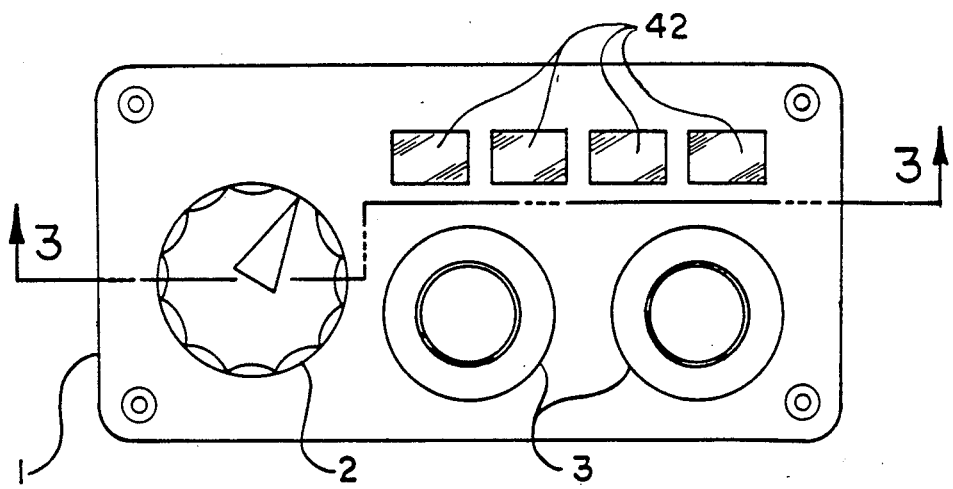
FIG. 4 is a top view showing the face plate of the unit according to one embodiment of the present invention.

FIG. 4 illustrates on preferred embodiment of a face plate assembly of the control unit according to the present invention. The assembly includes face plate 1 on which are mounted a rotatable temperature selection knob 2 and air transmitters 3. Air transmitter 3 include manually depressible actuating plungers. The face plate assembly also comprises the indicator light display 42, which overlie one end of the clear plastic light bars 13 as mentioned earlier.

Figure 5:
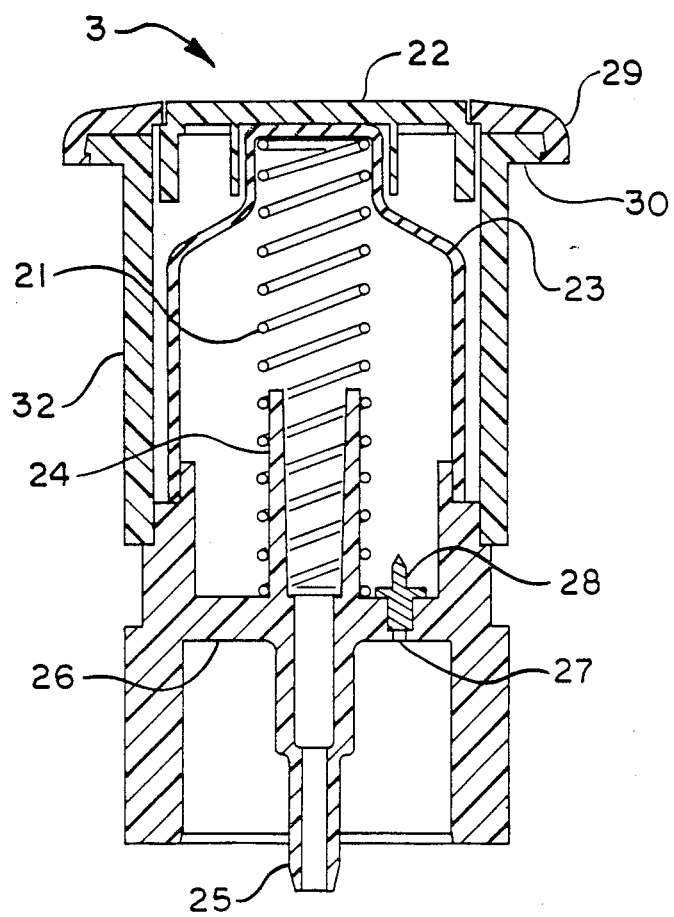
FIG. 5 is a cross sectional view taken in the direction 5—5 shown in FIG. 1 in accordance with one embodiment of the present invention.
Figure 6:
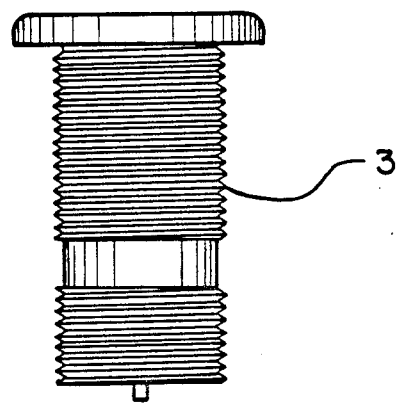
FIG. 6 is a side view of the air transmitter in accordance with the present invention.

FIG. 5 illustrates a preferred actuator means and specifically an air transmitter according to a preferred embodiment of the present invention. The transmitter includes a housing 32 molded from a high impact strength dimensionally stable plastic, as previously discussed. The exterior of the housing is preferably threaded as shown in FIG. 6 and comprises a recessed wall 26. Centered in the recessed wall 26 is a tubular fitting 25 to receive conduit (e.g., non-collapsible tubing and the like) to be connectable with a remote air switch means. The fitting 25 is protected by this recessed wall design. The air transmitter further comprises a bellows 23 sealed to the interior of housing 32 and is produced from a heat stable, oxidation resistant, halogen resistant elastomer, e.g., EPDM. This bellows is retained in the position shown by tensioning means 21, in this case a coil spring. The spring is mounted on a post 24. Air is returned to the bellows air space by opening 27. Interior to the opening is a one way valve, e.g., a one way check 23, to prevent the escape of any air when the air transmitter is being depressed. Plunger 22 fits over bellows 23 for depressing the bellows. The air transmitter also contains a shoulder 30 at the face plate 1 or plunger end of the transmitter housing to seat with the face plate or any receiving surface. A removable snap-fit trim piece 29 is attached to the forward end of housing 32; it may be removed and replaced with one of a different color, including metallic trim pieces, in order to fit into the general color scheme of the face plate for the unit. This particular air transmitter has been found to be effective, reliable and relatively easy to manufacture and produce. As previously pointed out, this air transmitter actuator means may be substituted for another equivalent actuator means, e.g., a cabled actuator.

Figure 7:
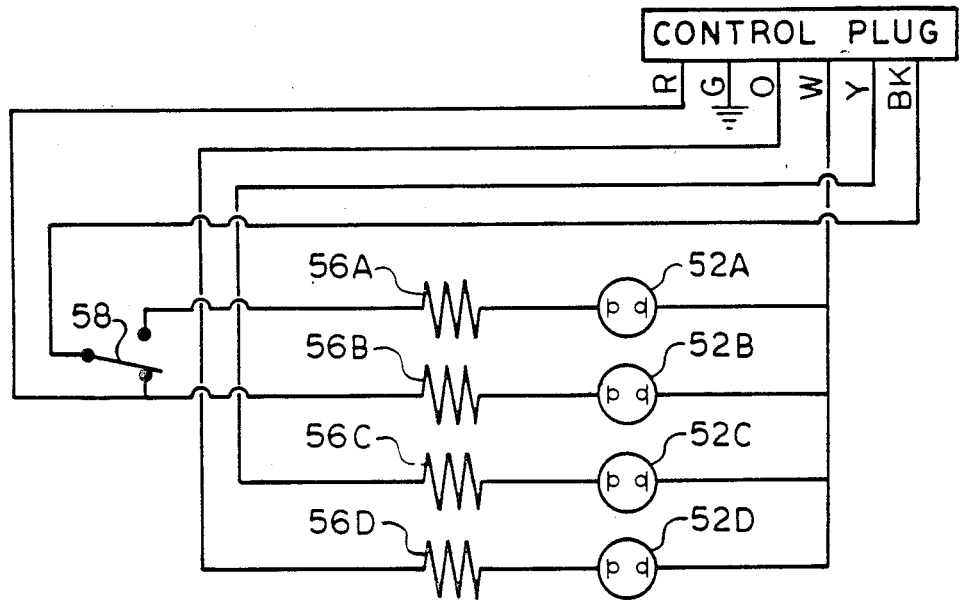
FIG. 7 is a circuit diagram for the circuit board controlling the light display of the control unit according to the present invention.

FIG. 7 illustrates a simple circuit diagram for a four light display for use in a standard spa or hot tub system. This is the circuit diagram for the circuit board 14 shown in FIG. 3. The circuit includes a control plug connectable to a power source and to the various components of the spa system being controlled by the control unit. A set of lamps 52A–D which can be neon lights located in grooves 54 at the lower ends of light bars 13, are connected in parallel. The respective lamps are connected in series with resistors 56A–56D. A thermostat switch 58 controls the illumination of lamps 52A and 52B. The other lamps indicate the state of load bearing equipment (pumps, blowers, spa lights and other associated equipment) under the control of the control unit.

While the invention has been described and illustrated above with reference to specific preferred embodiments thereof, those skilled in the art will appreciate that various changes, modifications and substitutions may be made therein without departure from the spirit of the invention. For example, different arrangement of the components, as well as the materials used to produce the components of the control unit according to the present invention may be applicable as a consequence of the nature of the various components employed, as well as such other expected variations or differences in results are contemplated in accordance with the practices of the present invention. It is intended, therefore, that the invention be limited only by the scope of the claims that follow.

It is claimed:

1. An apparatus for use in a spa or the like for remotely controlling a plurality of equipment associated with said spa comprising:
    a heat-stable, water-tight housing,
    thermostat means mounted within said water-tight housing,
    illumination means disposed within said water-tight housing,
    cord means mounted on said housing for connecting said thermostat means and said illumination means to a power source and said equipment wherein said illuminating means is operable to indicate operation of said equipment, and
    a face plate rigidly fixed to said housing and spaced a predetermined distance therefrom by electrically nonconductive means, said face plate including
    electrically-nonconductive control means connectable by electrically-nonconductive means to said equipment, said control means being operable to activate or deactivate said equipment,
    electrically-nonconductive indicator means connected to said illuminating means by electrically-nonconductive means, and
    temperature selecting means connected to said thermostat means by electrically nonconductive means.

2. An apparatus as defined in claim 1 wherein said control means is comprised of a plurality of identical air transmitters.

3. The apparatus according to claim 1 where said housing comprises circuit boards mounted therein for operating said indicator means and said thermostat means.

4. An apparatus for use in a spa or the like for remotely controlling a plurality of equipment associated with said spa from a single unit comprising:
    (a) a heat stable, water tight housing;
    (b) thermostat means mounted in said housing;
    (c) a face plate spaced at a predetermined distance from said housing comprising:
        interchangeable control means connectable to said equipment for remotely controlling said spa equipment; and indicator means connectable to said spa equipment for indicating the operation of spa equipment, said indicator means comprising a plurality of plastic bars for transmitting visible light wherein one end of said bars are attached to said face plate and the other end of said bars are attached to said housing;

(d) temperature selecting means mounted in said face plate remote from said thermostat means and means for connecting said thermostat means to said temperature selecting means; and (e) cord means mounted on said housing for connection to a power source and load switching spa equipment.

5. The apparatus according to claim 4 wherein said plastic bars are molded from polymethylmethacrylate and copolymers thereof.

6. The apparatus according to claim 4 wherein said plastic bars contain grooves in said ends attached to said housing to allow light bulbs to set in said grooves.

7. An apparatus for use in a spa or the like for remotely controlling a plurality of equipment associated with said spa from a single unit comprising:

(a) a heat stable, water tight housing;

(b) thermostat means mounted in said housing;

(c) a face plate spaced at a predetermined distance from said housing comprising:
interchangeable control means connectable to said equipment for remotely controlling said spa equipment,
said control means comprising an air transmitter comprising:
  (a) a housing
  (b) a shoulder mated to one end of said housing adapted to seat in said face plate and to receive a snap-fit trim piece which coordinates with the scheme of said face plate;
  (c) a recessed wall comprising the other end of said housing wherein said recessed wall comprises a tubular fitting centered in said wall and extending beyond said housing for receiving conduit, said recessed wall further comprises an opening to allow for the passage of air and connected to said opening and interior thereto a one way valve;
  (d) an elastomer bellows sealed in the interior of said housing, said bellows containing tension means to return said bellows to an expanded position after compression;
  (e) plunger means accessible on said face plate and adapted to compress said bellows to actuate a remote switch means for remotely located spa equipment; and means connectable to said spa equipment for indicating the operation of spa equipment;

(d) temperature selecting means mounted in said face plate remote from said thermostat means and means for connecting said thermostat means to said temperature selecting means; and (e) cord means mounted on said housing for connection to a power source and load switching spa equipment.

8. The apparatus according to claim 7 wherein said bellows is produced from a heat stable elastomer that is resistant to degradation by oxygen, ozone and halogens.

9. The apparatus according to claim 7 wherein said one way valve connected to said opening in said recessed wall is a one way check valve.

10. The apparatus according to claim 7 wherein said housing is cylindrical and the exterior surface of said housing is threaded.

11. The apparatus according to claim 7 wherein said tension means is a coil spring.

* * * * *